United States Patent [19]
Burdick

[11] Patent Number: 5,850,808
[45] Date of Patent: Dec. 22, 1998

[54] SYSTEM FOR REPELLING PESTS

[75] Inventor: Brett R. Burdick, Knoxville, Tenn.

[73] Assignee: FI-Shock, Inc., Knoxville, Tenn.

[21] Appl. No.: 949,423

[22] Filed: Oct. 14, 1997

[51] Int. Cl.⁶ ................................................ A01K 29/00
[52] U.S. Cl. ............................................. 119/903; 52/101
[58] Field of Search ................................ 119/903, 905, 119/908, 531; 52/101; 256/10

[56] References Cited

U.S. PATENT DOCUMENTS

| | | | |
|---|---|---|---|
| 1,805,859 | 5/1931 | White | 119/903 |
| 2,400,829 | 5/1946 | Kennedy | 256/10 |
| 2,928,204 | 3/1960 | Kahn et al. | 43/107 |
| 3,148,417 | 9/1964 | Bellas | 119/903 |
| 3,294,893 | 12/1966 | Shaffer | 119/903 |
| 3,366,854 | 1/1968 | Robinson | 317/262 |
| 3,504,892 | 4/1970 | Crist | 256/10 |
| 3,717,802 | 2/1973 | Plevy et al. | 317/262 |
| 3,847,120 | 11/1974 | Hicks | 119/29 |
| 3,878,444 | 4/1975 | Miller | 317/262 S |
| 4,015,176 | 3/1977 | Shanahan et al. | 361/232 |
| 4,143,437 | 3/1979 | Voykin | 19/903 |
| 4,165,577 | 8/1979 | Shanahan et al. | 43/112 |
| 4,299,048 | 11/1981 | Bayes | 43/98 |
| 4,471,561 | 9/1984 | Lapierre | 43/108 |
| 4,805,558 | 2/1989 | Lehmann | 119/29 |
| 4,862,637 | 9/1989 | Dressel | 43/98 |
| 5,095,646 | 3/1992 | Bunkers | 43/98 |
| 5,255,896 | 10/1993 | Letarte et al. | 256/10 |
| 5,460,123 | 10/1995 | Kolz | 119/220 |

OTHER PUBLICATIONS

Sketch, 1 sheet, May 1996.

*Primary Examiner*—Thomas Price
*Attorney, Agent, or Firm*—Luedeka, Neely & Graham, P.C.

[57] ABSTRACT

A system for repelling pests provided by an elongate A-shaped plastic support having three spaced apart conductors running along the length of the support, with the middle conductor elevated relative to the other conductors and connected to a different potential of a power supply than the other conductors such that when a pigeon or other pest steps on adjacent conductors a circuit is completed to electrically shock the pest.

16 Claims, 3 Drawing Sheets

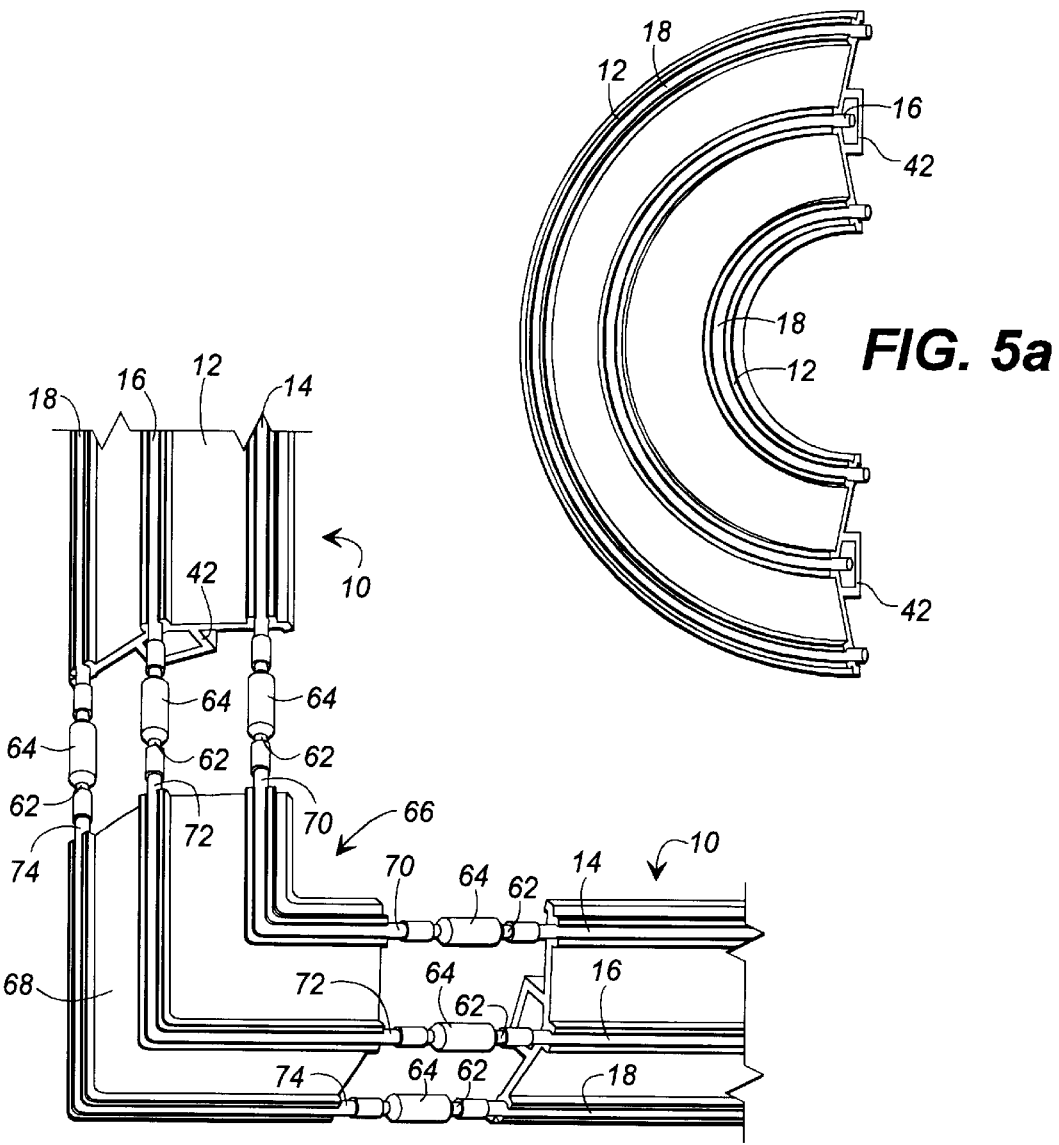
FIG. 5a
FIG. 5
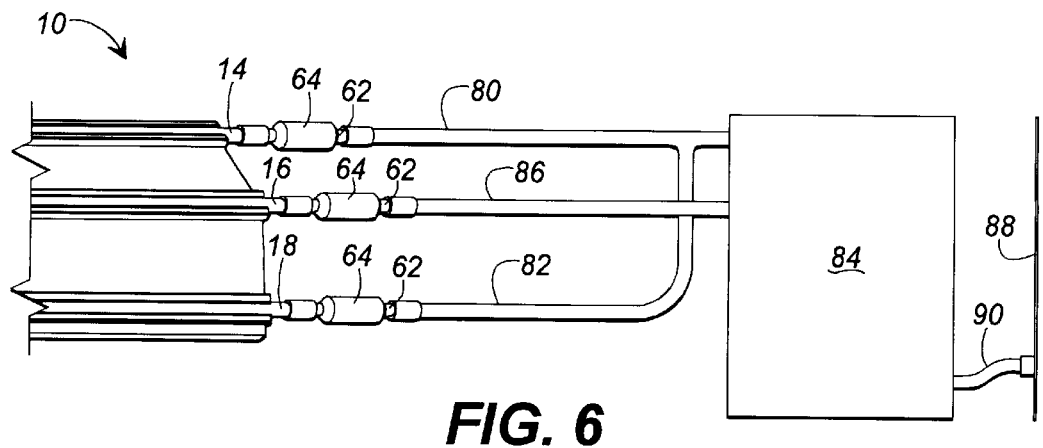
FIG. 6 though it is contemplated that the clip members could be otherwise configured depending on the cross sectional configuration of the conductors utilized.

5,850,808

SYSTEM FOR REPELLING PESTS

FIELD OF THE INVENTION

This invention relates generally to devices for repelling pests. More particularly, this invention relates to devices for repelling birds by electrical shock.

BACKGROUND AND SUMMARY OF THE INVENTION

Electrical shock devices are known for repelling animals from areas in which they are unwanted. For example, it is desirable to deter the roosting of pigeons on the eves of buildings as their droppings may accumulate over time to the point that the appearance of the building is diminished. Attempts have been made to provide electrical barriers to repel pest birds. However, these devices are generally disadvantageous as they are difficult to install, aesthetically unpleasing and their operation is adversely affected by exposure to the elements and accumulation of leaves and twigs on the devices.

Accordingly, it is an object of the present invention to provide an improved device for repelling pests.

It is another object of the invention to provide a device of the character described which repels pests such as pigeons by electrical shock.

It is an additional object of the invention is to provide a device of the character described which is easier to install as compared to prior devices A further object of the invention is to provide a device of the character described which is less susceptible to the deleterious effects of the elements and debris as compared to prior devices.

Yet another object of the invention is to provide a device of the character described which is more aesthetically pleasing as compared to prior devices.

A still further object of the invention is to provide a device of the character described which is uncomplicated in configuration and economical.

Having regard to the foregoing and other objects, the present invention is directed to a system for repelling pests comprising a support provided by an electrically non-conductive material, the support having at least three spaced apart grooves defined thereon of substantially equal length. The positioning of the grooves provides at least one middle groove having a groove on each side thereof and spaced apart from the middle groove a distance corresponding to the width of an appendage of the pest to be repelled. A conductor is received within each groove and is electrical communication with a power supply. The power supply has oppositely charged poles for providing electrical power to each conductor. Each conductor received within each middle groove is in electrical communication with one pole of the power supply. The remaining conductors are in electrical communication with the other pole of the power supply such that the placement of the appendage of the pest in contact with a conductor in electrical communication with each pole of the power supply completes an electronic circuit so that an electric current is applied to the pest.

A significant aspect of the invention relates to the provision of a system which avoids interference from environmental factors such as rain and debris. For example, in one preferred embodiment of the pest repelling system, the support is A-shaped such that the outer conductors are provided on sloped surfaces, with the middle conductor elevated above the outer conductors such that puddling or accumulation of water is avoided and water does not tend to bridge between adjacent conductors and complete the electrical circuit to short out the system. Further avoidance of water accumulation is provided by raised sidewalls which are provided adjacent the conductors to deflect water away from the conductors. Likewise, the configuration tends to avoid the accumulation of leaves and twigs on the system and across adjacent conductors.

BRIEF DESCRIPTION OF THE DRAWINGS

The above and other features and advantages of the present invention will become further known from the following detailed description when considered in conjunction with the accompanying drawings in which:

FIG. 5 is a perspective view of another embodiment of the invention having an L-shaped corner portion and FIG. 5a shows an embodiment having a curved configuration.

FIG. 6 is a schematic representation of the connection of a power supply to the component of FIG. 1.

DETAILED DESCRIPTION

Figure 1:
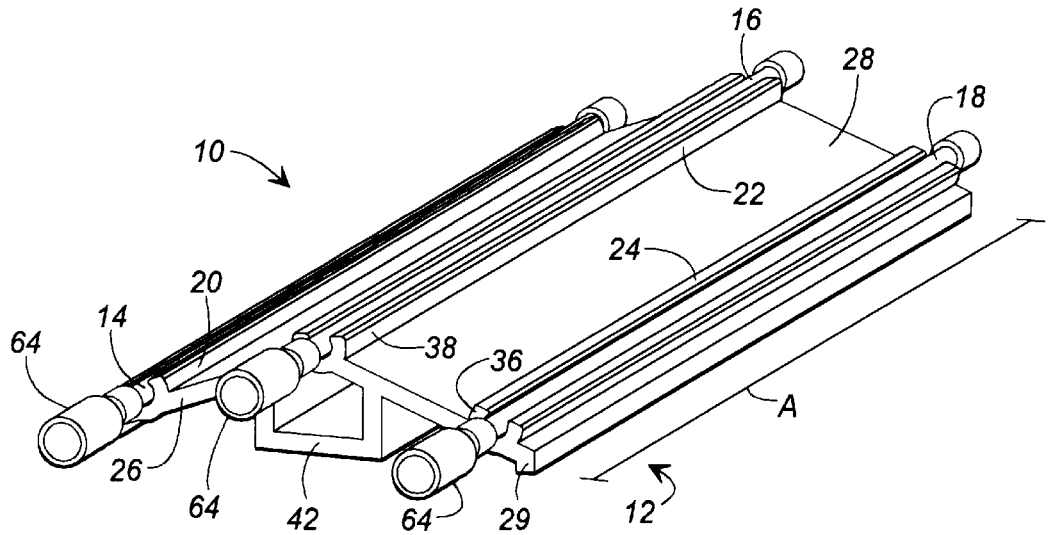
FIG. 1 is a perspective view of a preferred embodiment of a modular component of a system for repelling birds provided in accordance with the invention.

With initial reference to FIG. 1, there is shown a pest repelling system 10 in accordance with the invention. In a preferred embodiment, the system 10 includes a support 12 and a plurality of conductors 14, 16 and 18 maintained on the support 12 as by clip members 20, 22 and 24, respectively.

Figure 2:
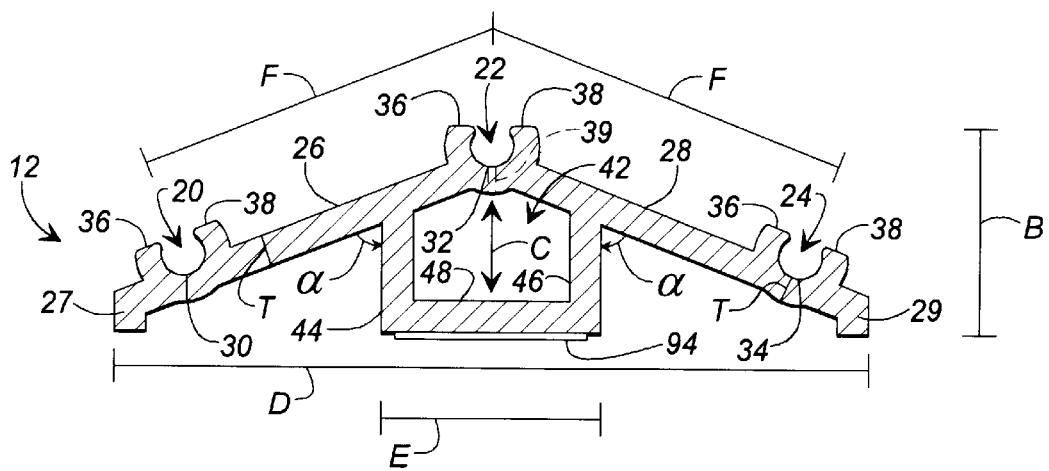
FIG. 2 is an end view of the component of FIG. 1.

With reference to FIG. 2, the support 12 is preferably of one piece construction and made of a non-conductive plastic material, preferably an ultra-violet light inhibited polyvinyl chloride ("PVC"), using extrusion techniques.

The support 12 is preferably somewhat "A-shaped" in cross section to provide a pair of oppositely sloped legs 26 and 28 which extend downwardly from opposite sides of the clip member 22 at an angle $\alpha$ of preferably from about 30° to about 70°. Leglets 27 and 29 are preferably provided at the lower ends of the legs 26 and 28, respectively, to provide a flat interface between the sides of the support 12 and the underlying surface on which the support is positioned, such as the ground, a terrace or a ledge.

The clip members 20–24 are preferably configured to provide semi-circular troughs 30, 32 and 34, respectively. The clip members 20–24 are preferably co-formed with the support during the extrusion process such that a substantially constant thickness T of the support is maintained, including the troughs 30–34. The thickness T is preferably from about $1/32$ of an inch to about $1/8$ of an inch, most preferably about $1/16$ of an inch.

The conductors 14, 16, 18 are preferably provided by lengths of bare conductive wire, such as aluminum or copper or other electrically conductive material. A preferred wire for the conductors is 9 AWG aluminum wire. To facilitate installation and retention of the conductor 14 within the clip member 20, the clip members 20–24 each preferably includes raised sidewalls 36 and 38 which are biased inwardly to grip the conductor. As will also be appreciated, the sidewalls 36 and 38 also serve to deflect moisture and debris away from the conductors and troughs.

In this regard, it is noted that the fit between the sidewalls 36, 38 and the conductors is preferably of sufficient snugness to eliminate air gaps and to provide a substantially water tight seal to prevent moisture and debris from entering the troughs. However, it will be understood that condensation and other forms of moisture may come to be present in the troughs and, if desired, small apertures 39 may be provided through the thickness T of the troughs at spaced intervals along their length to enable drainage of such moisture.

Figure 2A:
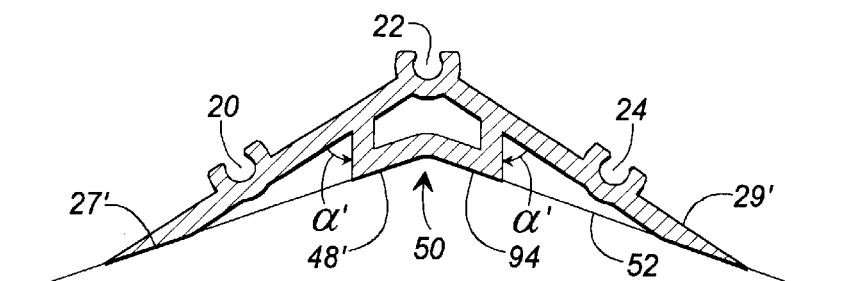
FIG. 2a is an end view of an alternate embodiment of the component of FIG. 1
Figure 2B:
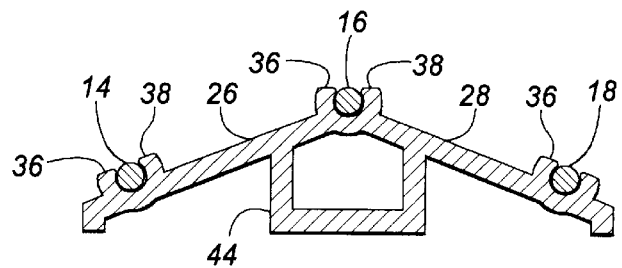
FIG. 2b is an end view of FIG. 1.

The troughs 30–34 are preferably sized to grip the conductors substantially along their length and height, with the upper curvature of the conductors 14–18 exposed for contact with an appendage of a pest (FIG. 2b). In this regard, it is further noted that the spacing between adjacent conductors, i.e., distance F between conductor 14 and 16, and between conductor 16 and 18 is preferably sized to correspond to the width or length of the foot of a pigeon and is preferably from about ½ inch to about 1½ inches, most preferably about 1 inch.

An elongate channel 42 is preferably provided below the clip member 22 to add to the strength and rigidity of the support 12 and to facilitate mounting of the system. The channel preferably includes sidewalls 44 and 46 extending upwardly from opposite sides of a bottom 48 toward the legs 26 and 28, respectively. The bottom 48 is preferably substantially flat for use on flat surfaces but may be made in other configurations specific to the mounting surface. For example, as shown in FIG. 2a, the bottom (shown as bottom 48') may be configured to fit an eve 50 of a roof 52 and the orientation of leglets 27' and 29' and angle ∝" redirected to flatly abut the roof 52.

For the purpose of an example, the system 10 of FIG. 1 is preferably dimensioned as set forth in Table 1 below for use with pigeons. However, it will be appreciated that the system may be provided in various configurations and dimensions to enable its use with various other creatures such as squirrels, rabbits or other animals.

TABLE 1

| Dimension | Distance (inches) |
|---|---|
| A | from about 12 to about 60 |
| B | ½ |
| C | ¼ |
| D | 2 |
| E | ½ |
| F | 1 |

Figure 3:
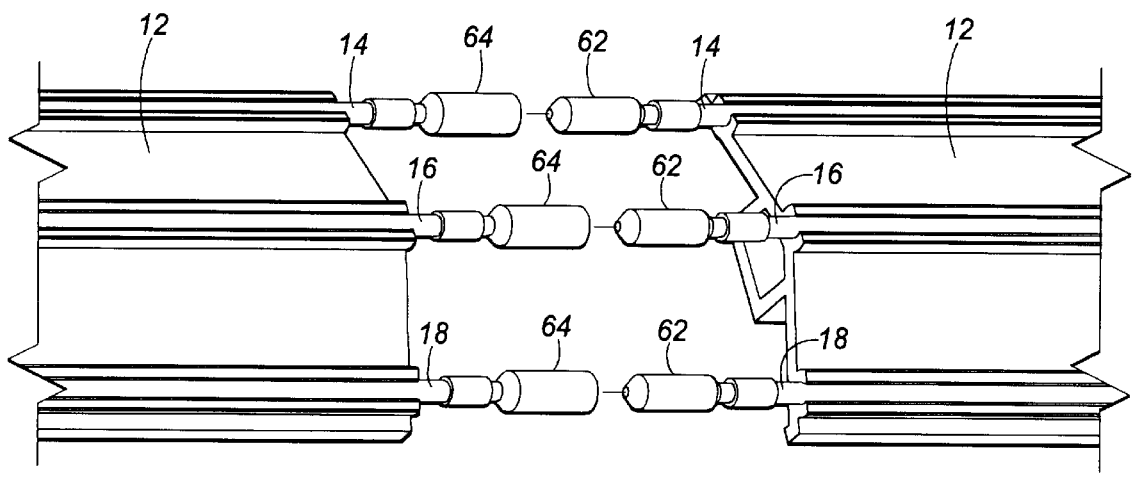
FIG. 3 is a perspective view showing a pair of the components of FIG. 1 prior to their mating.
Figure 4:
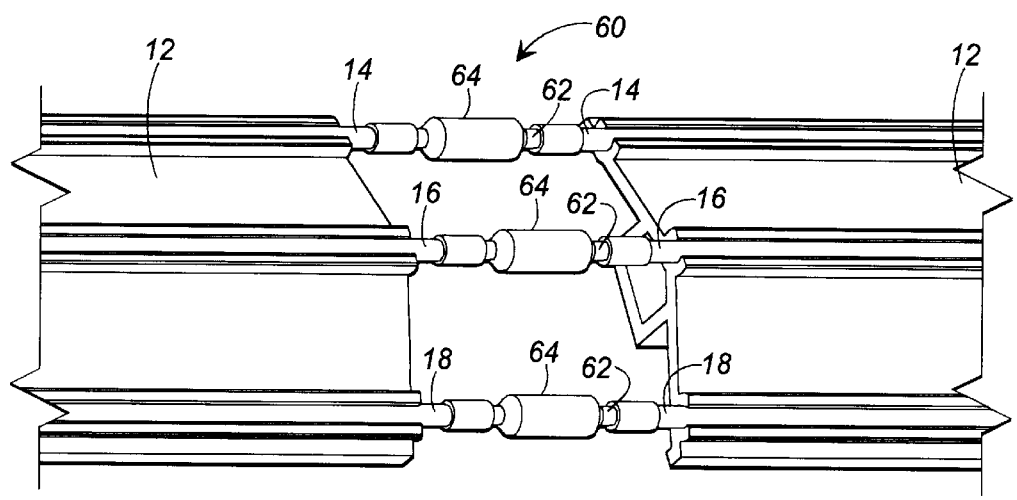
FIG. 4 is a perspective view of the components of FIG. 3 in a mating relationship.

With continuing reference to FIG. 1 and with reference to FIGS. 3 and 4, each system 10 provided by one of the supports 12 and its conductors 14–18 may be joined in electrical communication with another system of the same or different configuration (i.e., straight, curved or angled) to enable a repelling system 60 of virtually any length or configuration. To this end, one end of each conductor 14, 16, 18 is preferably fitted with a male connector 62 and the other end with a female connector 64 configured for receiving the male connector 62 of an adjoining system. The connectors 62 and 64 are fittingly received by one another to provide a tight connection which resists intrusion of water and debris into the connection to avoid interruption of the electrical connection between components.

Accordingly, it will be appreciated that each system 10 may be provided in virtually any length and may be shaped to conform to a particular mounting surface such that the repelling system 60 may be readily customized to a particular installation site.

For example, and with reference to FIG. 5, the system may be readily installed onto the ledge of a typical building structure by use of corner members 66 which may be provided to extend around virtually any shaped corner. In a preferred embodiment the corner member 66 includes an L-shaped support 68 in the shape of a 90° angle with corresponding conductors 70, 72 and 74 bent to correspond to the configuration of the support 68. However, it will be understood that the support may be provided in various other shapes, such as other angular configurations or curved (FIG. 5a). As will be appreciated, the conductors 70, 72, 74 are fitted with connectors 62 and 64 in the manner described previously for the conductors 14–18.

With reference to FIG. 6, electrical power is preferably supplied to the conductors by connection of the conductors 14 and 18 of a system 10 to leads 80 and 82 from a power supply 84 and connection of the conductor 16 of a system 10 to another lead 86 of the power supply 84 and connectors 64 and 62, it being understood that the down line conductors are in serial connection with the other conductors via the connectors 62 and 64. Leads 80 and 82 are preferably in electrical communication with one pole of the power supply (e.g., the "−" or negative pole) and the lead 86 with the other pole (e.g., the "+" or positive pole, or vice-versa).

Electrical power may be supplied to the power supply as by connection of the supply 84 to a standard 110 VAC outlet 88 as by cord 90. The power supply 84 is preferably a power supply available under the trade name SURE SHOCK CONTROLLER (Model SS-550) from Fi-Shock Inc. of Knoxville, Tenn. and having a nominal output voltage of about 1,200 VAC intermittent with a nominal maximum short-circuit output current of about 12 mA. Other suitable power supplies include a solar powered power supply available under the tradename SOLAR SHOCK (Model SS-440) from Fi-Shock Inc. and having a nominal output voltage of about 7,500 VDC intermittent with a nominal maximum short-circuit current of about 3 amps.

As will be appreciated, a circuit between conductors 14 and 16 or conductors 16 and 18 is completed when the air space therebetween is bridged, as by placement of the foot of a pigeon across conductors 14 and 16 or 16 and 18. Completion of the circuit in this manner enables current to travel along the involved conductors, thus exposing the pigeon to an electrical shock. A pigeon may, in this manner, be exposed to a voltage of from about 200 V to about 7,000 V at a current of from about 5 mA to about 500 mA, with an output pulse duration of from about 100 $\mu$sec to about 400 $\mu$sec. It has been observed that this exposure does not harm the pigeon but is generally sufficient to cause the pigeon to be startled and to leave the area after a few exposures.

The present invention offers significant advantages over prior devices in that it is convenient to use, aesthetically pleasing due to its overall low profile and appearance, and avoids many disadvantages of prior devices. For example, installation may be readily accomplished as by use of fasteners such as hook and loop material, double sided tape or adhesive 94 adhered between the bottom 48 and the underlying structure onto which the system 10 is to be mounted, such as a building ledge or roof. In addition, the invention is readily adapted to various sites and offers considerable flexibility in the numerous configurations in which the system may be provided.

It will further be appreciated that the A-shaped configuration and other features of the invention help to avoid damage or interference with operation from exposure to the elements and debris, such as leaves and twigs, common to roofs and ledges. For example, a twig that lands on a flat surface will tend to remain where it lands. However, a twig that lands on the A-frame shape of the present invention will tend to be deflected to the side by its own momentum or by shifts in its position caused by wind or rain.

In addition, repellant systems provided in accordance with the invention are less susceptible to interference from moisture such as rainwater. For example, the system tends to shed moisture and reduce the likelihood that water will puddle and thereby bridge between adjacent conductors.

The foregoing description of certain embodiments of the present invention has been provided for purposes of illustration only, and it is understood that numerous modifications or alterations may be made without departing from the spirit and scope of the invention as defined in the following claims.

What is claimed is:

1. A system for repelling pests comprising:
   a support provided by an electrically non-conductive material, the support having at least three spaced apart grooves defined thereon of substantially equal length to provide at least one middle groove having an outer groove on each side thereof and spaced apart from the middle groove a distance corresponding to the width of an appendage of the pest to be repelled,
   a conductor received within each groove,
   a power supply having oppositely charged poles for providing electrical power to each conductor, wherein each conductor received within each middle groove is in electrical communication with one pole of the power supply and the adjacent conductors in the outer grooves are in electrical communication with the other pole of the power supply such that the placement of the appendage of the pest in contact with a conductor in electrical communication with each pole of the power supply completes an electronic circuit so that an electric current is applied to the pest.

2. The system of claim 1 wherein the middle groove of the electrically non-conductive support is vertically elevated relative to the outer grooves.

3. The system of claim 2 wherein the grooves include raised sidewalls which extend upwardly from the support for intimately receiving the conductors.

4. The system of claim 1 wherein multiple electrically non-conductive supports are connected in series by means of connectors that terminate the conductors on one end of the support and mating connectors which terminate the conductors on the other end of the respective support.

5. The system of claim 1 wherein the non-conductive support has a generally A-shaped cross-section.

6. The system of claim 1 wherein the conductors comprise aluminum wire.

7. A system for repelling pests comprising an elongate A-shaped plastic support having at least three spaced apart conductors running along the length of the support, with a middle conductor elevated relative to the other conductors and each conductor in electrical communication with a power supply and the middle conductor in electrical communication with a different potential of a power supply than the other conductors such that when a pigeon or other pest steps on adjacent conductors a circuit is completed to electrically shock the pest.

8. The system of claim 7, further comprising troughs provided on the support for receiving the conductors.

9. The system of claim 8, further comprising raised sidewalls adjacent outer edges of the troughs and extending upwardly from the support.

10. A system for repelling pests comprising a plurality of plastic supports, each support having a generally A-shaped cross-section and three spaced apart conductors positioned adjacent an upper surface of the support, with the middle conductor of each support releasably connectable in electrical communication with the middle conductor of its adjacent supports and elevated relative to the other conductors of the support.

11. The system of claim 10, wherein each conductor is in electrical communication with a power supply, with each middle conductor in electrical communication with a different potential of the power supply than the other conductors such that when a pigeon or other pest steps on adjacent conductors a circuit is completed to electrically shock the pest.

12. The system of claim 10, wherein at least one support has a generally straight length axis.

13. The system of claim 10, wherein at least one support is of non-linear length.

14. The system of claim 13, wherein the non-linear length comprises a angle.

15. The system of claim 13, wherein the non-linear length comprises a curve.

16. A device for electrically repelling pests, comprising a non-conductive support having a pair of oppositely sloping legs and an elongate channel underneath the legs provided by a pair of sidewalls, one each depending downwardly from a lower surface of one of the sloping legs, and a cross-member connecting between lowermost portions of the sidewalls and having a lower surface configured for engaging a surface on which the device is to be mounted; a plurality of elongate channels defined on upwardly facing surfaces of the support, one of the elongate channels being defined on an upper surface of each of the sloping sidewalls adjacent an exposed edge thereof and one of the elongate channels being defined adjacent a raised portion of the support defined by juncture of the two sidewalls; and a plurality of elongate conductors, one each securably received within one of the elongate channels such that an upper curved portion of each of the conductors is exposed for contact with an appendage of a pest, each of the conductors being electrically connectable to a power supply, with adjacent conductors being electrically connectable to opposite poles of the power supply and spaced part from one another such that placement of the appendage of a pest across adjacent conductors completes an electronic circuit and electrical current is applied to the pest.

* * * * *